(12) United States Patent
Lewis et al.

(10) Patent No.: US 10,412,570 B2
(45) Date of Patent: Sep. 10, 2019

(54) BROADCASTING DEVICE STATUS

(71) Applicant: Google LLC, Mountain View, CA (US)

(72) Inventors: Peter Lewis, London (GB); Peter Sekio Sasaki, London (GB)

(73) Assignee: Google LLC, Mountain View, CA (US)

( * ) Notice: Subject to any disclaimer, the term of this patent is extended or adjusted under 35 U.S.C. 154(b) by 71 days.

(21) Appl. No.: 15/056,675

(22) Filed: Feb. 29, 2016

(65) Prior Publication Data
US 2017/0251506 A1    Aug. 31, 2017

(51) Int. Cl.
| | |
|---|---|
| *H04W 4/70* | (2018.01) |
| *H04W 4/80* | (2018.01) |
| *H04W 8/00* | (2009.01) |
| *H04H 20/61* | (2008.01) |
| *H04L 29/08* | (2006.01) |
| *H04W 76/14* | (2018.01) |

(52) U.S. Cl.
CPC .............. *H04W 8/005* (2013.01); *H04L 67/12* (2013.01); *H04L 67/16* (2013.01); *H04W 4/70* (2018.02); *H04W 4/80* (2018.02); *H04W 76/14* (2018.02); *H04H 20/61* (2013.01)

(58) Field of Classification Search
CPC .............. H04W 76/023; H04L 12/2823; H04L 12/2803; G08C 2200/00
See application file for complete search history.

(56) References Cited

U.S. PATENT DOCUMENTS

| | | | |
|---|---|---|---|
| 8,453,186 B2 * | 5/2013 | Roberts ............... | H04N 5/4403 345/156 |
| 8,849,317 B2 | 9/2014 | Nair et al. | |
| 8,885,552 B2 * | 11/2014 | Bedingfield, Sr. ......................... | H04L 12/2818 348/734 |

(Continued)

FOREIGN PATENT DOCUMENTS

| | | |
|---|---|---|
| CN | 101754097 A | 6/2010 |
| EP | 2741528 | 6/2014 |

(Continued)

OTHER PUBLICATIONS

International Search Report and Written Opinion in International Application No. PCT/US2016/069531, dated Apr. 5, 2017, 15 pages.

(Continued)

*Primary Examiner* — Kevin C. Harper
(74) *Attorney, Agent, or Firm* — Shumaker & Sieffert, P.A.

(57) ABSTRACT

Methods, systems, and apparatus, including computer programs encoded on computer storage medium for implementing the advertisement of device status information. In one aspect, configuration data for the second device is obtained, where the configuration data indicating a current operating mode of the second device or a user-specified configuration of the second device. The stored radio transmitter identifier is accessed from the one or more data storage devices. A first advertisement that indicates the radio transmitter address (Continued)

and the radio transmitter identifier is generated. A second advertisement is generated that indicates the radio transmitter address and an encoding of the configuration data for the second device. Using the radio transmitter, a series of advertisements that includes at least the first advertisement and the second advertisement is broadcasted.

20 Claims, 4 Drawing Sheets

(56) References Cited

U.S. PATENT DOCUMENTS

| | | | | |
|---|---|---|---|---|
| 2007/0021141 | A1* | 1/2007 | Yokota | G06F 21/10 455/550.1 |
| 2007/0026794 | A1* | 2/2007 | Ayyagari | H04L 41/00 455/11.1 |
| 2008/0105001 | A1* | 5/2008 | Jeong | D06F 33/02 68/12.02 |
| 2010/0004763 | A1* | 1/2010 | Murakami | H04L 12/2809 700/83 |
| 2010/0153999 | A1* | 6/2010 | Yates | H04N 5/44543 725/39 |
| 2011/0106279 | A1* | 5/2011 | Cho | G08C 17/02 700/90 |
| 2013/0214909 | A1 | 8/2013 | Meijers et al. | |
| 2013/0217332 | A1 | 8/2013 | Altman et al. | |
| 2013/0326090 | A1 | 12/2013 | Gillingham | |
| 2014/0052300 | A1* | 2/2014 | Matsuoka | G05D 23/1917 700/276 |
| 2014/0148147 | A1* | 5/2014 | Tak | H04M 1/72533 455/420 |
| 2014/0351181 | A1* | 11/2014 | Canoy | G06N 5/04 706/12 |
| 2015/0067050 | A1* | 3/2015 | Kim | H04L 67/16 709/204 |
| 2016/0028828 | A1* | 1/2016 | Tadajewski | H04L 12/2818 370/254 |
| 2016/0065719 | A1* | 3/2016 | Jeong | H04W 12/06 455/420 |
| 2016/0287930 | A1* | 10/2016 | Moser | A63B 71/0622 |
| 2016/0358443 | A1* | 12/2016 | True | G08B 21/02 |
| 2016/0360344 | A1* | 12/2016 | Shim | G06F 3/04817 |
| 2017/0230472 | A1 | 8/2017 | Hasegawa et al. | |
| 2018/0101342 | A1* | 4/2018 | Riveiro | G06F 3/1236 |

FOREIGN PATENT DOCUMENTS

| | | |
|---|---|---|
| JP | 2007174583 A | 7/2007 |
| JP | 2015520459 A | 7/2015 |
| JP | 2016116112 A | 6/2016 |
| JP | 2017142610 A | 8/2017 |
| KR | 10-2005-0045059 A | 5/2005 |
| KR | 10-2013-0020904 A | 3/2013 |
| KR | 10-2013-0077733 A | 7/2013 |
| WO | 2014/135711 | 9/2014 |
| WO | 2015/137045 | 9/2015 |

OTHER PUBLICATIONS

Jameel et al. "Low-power wireless advertising software library for distributed M2M and contextual IoT," 20155 IEEE $2^{nd}$ World Forum on Internet of Things, Dec. 15, 2015, 6 pages.

iBeacon Insider, "iBeacon Wars: A Guides to iBeacon Solutions," Mar. 2014 [retrieved on Aug. 16, 2016]. Retrieved from the Internet: URL<http://www.ibeacon.com/ibeacon-wars-a-guide-to-the-major-ibeacon-companies/>, 17 pages.

Mashbridge, "Eddystone Protocol Specification," GitHub, Sep. 7, 2015 [retrieved on Feb. 19, 2016]. Retrieved from the Internet: URL<https://github.com/google/eddystone/blob/master/protocol-specification.md>, 2 pages.

Mashbridge, "Eddyston-TLM," GitHub, Jul. 16, 2015 [retrieved on Feb. 19, 2016]. Retrieved from the Internet: URL <https://github.com/google/eddystone/tree/master/eddystonetlm>, 2 pages.

The Notification of Reason for Rejection, and translation thereof, from counterpart Japanese Application No. 2018-524744, dated Oct. 23, 2018, 6 pp.

Response to the Communication under 161(2) and 162 EPC dated Oct. 8, 2018, from counterpart European Application No. 16829475.9, filed Mar. 13, 2019, 10 pp.

International Preliminary Report on Patentability issued in International Application No. PCT/US2016/069531, dated Sep. 13, 2018, 8 pages.

Notice of Office Action, and translation thereof, from counterpart Korean Application No. 10-2018-7013635, dated Apr. 18, 2019, 14 pages.

* cited by examiner

BROADCASTING DEVICE STATUS

BACKGROUND

On a daily basis a person may interact with multiple different types of devices having variable states. The state of the devices at the time of use of each respective device is often unknown.

SUMMARY

Aspects of the present disclosure may facilitate broadcasting device status information using a radio transmitter such as wireless beacon. Such device status information may include, for example, a set of data that provides an indication regarding the state of the device at the time the device status information was broadcast. The device status information may include data that is indicative of a user configuration for the device. In one aspect, device status information may be encoded into a radio transmitter advertisement. A user's mobile platform may detect the broadcasted advertisement that includes the device status information when the user's mobile platform is within range of the radio transmitter's broadcasts.

In a general aspect, a method includes obtaining, by a transmitter device, configuration data for a second device, the configuration data indicating a current operating mode of the second device or a user-specified configuration of the second device; accessing the stored radio transmitter identifier from the one or more data storage devices; generating a first advertisement that indicates the radio transmitter address and the radio transmitter identifier; generating a second advertisement that indicates the radio transmitter address and an encoding of the configuration data for the second device; and broadcasting, using the radio transmitter, a series of advertisements that includes at least the first advertisement and the second advertisement.

In some implementations, obtaining the configuration data for the second device includes: in response to the second device receiving, from a particular user, user input that configures the second device to operate in a particular operating mode, receiving, by the transmitter device, configuration data that indicates the particular operating mode of the second device specified by the user input from the particular user. Generating the second advertisement includes generating the second advertisement to indicate the particular operating mode of the second device specified by the user input from the particular user. Broadcasting the series of advertisements includes transmitting the first advertisement and the second advertisement, from the transmitter device to a mobile device of the particular user, over a direct wireless communication link between the transmitter device and the mobile device of the particular user.

In some implementations, transmitting the second advertisement includes transmitting the second advertisement to the mobile device of the particular user while the second device is operating in the particular operating mode specified by the user input from the particular user.

In some implementations, transmitting the second advertisement includes transmitting the first advertisement or the second advertisement at a transmission power level that restricts reception to within a predetermined level of proximity to the second device.

In some implementations, the transmitter device is attached to or integrated into the second device, wherein the transmitter device is configured to obtain the configuration data from the second device, and the second device is a home appliance, a vehicle, an exercise device, or an entertainment device.

In some implementations, the operations further include determining that a predetermined period of time has expired, and the device status information is obtained in response to the determination that the predetermined period of time has expired.

In some implementations, broadcasting the series of advertisements that includes at least the first advertisement and the second advertisement includes: broadcasting the first advertisement and the second advertisement at different power levels using the radio transmitter, wherein the first advertisement is broadcast at a lower power level than the second advertisement.

In some implementations, the radio transmitter identifier includes a namespace identifier and an instance identifier.

In some implementations, the namespace identifier identifies a group of radio transmitters, and the instance identifier identifies a particular radio transmitter within the group of radio transmitters.

In some implementations, the radio transmitter address is a Bluetooth address or a media access control address.

In some implementations, the first advertisement and the second advertisement are each generated according to an Eddystone frame format.

In some implementations, the transmitter device is a beacon configured for one-way communication over a wireless interface, the beacon being configured to not receive transmissions over the wireless interface, and generating the second advertisement includes generating the second advertisement to exclude the radio transmitter identifier.

In some implementations, the operations include: obtaining, at each of multiple different times according to a predetermined interval, configuration data indicating a current operating mode of the second device, the current operating modes being different for at least some of the different times; and generating, for each of the multiple different times, a status advertisement indicating the current operating mode of the second device indicated by the obtained configuration data. Broadcasting the series of message includes: broadcasting the status advertisements at a predetermined interval, each of the status advertisements indicating the current mode of operation of the second device at the time the status advertisement is transmitted; and broadcasting one or more repetitions of the first advertisement between each status advertisement broadcast.

In some implementations, broadcasting the series of advertisements includes interleaving the first advertisement and the status advertisements such that multiple repetitions of the first advertisement are transmitted between each status advertisement broadcast.

In some implementations, the operations further include: after broadcasting the first advertisement and the second advertisement, obtaining additional configuration data for the second device that is different from the previously obtained configuration data, the additional configuration data indicating a configuration or mode of operation that was changed by a user of the second device after broadcast of the second advertisement; in response to receiving the additional configuration data, generating a third advertisement that indicates the radio transmitter address and an encoding of the additional configuration data for the second device indicating the configuration or mode of operation that was changed by the user of the second device; and broadcasting the third advertisement and one or more additional repetitions of the first advertisement.

Other versions include corresponding systems, apparatus, methods, and computer programs, configured to perform the actions of the operations described above. In some implementations, the operations may be instructions that are encoded on a computer storage device.

The details of one or more implementations are set forth in the accompanying drawings and the description below. Other features and advantages will be apparent from the description and drawings, and from the claims.

DETAILED DESCRIPTION

Figure 1:
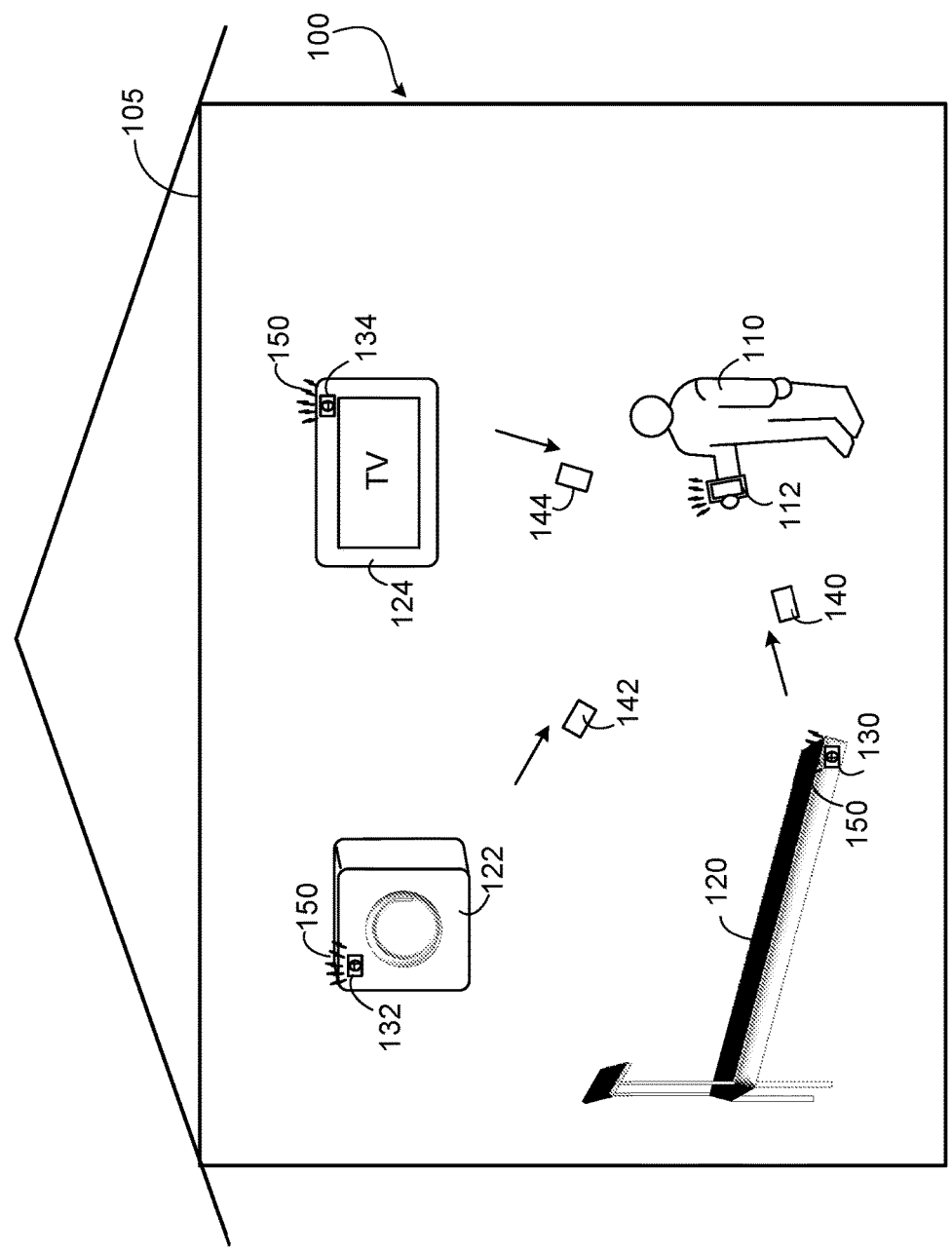
FIG. 1 is a contextual diagram of an example of a system for broadcasting device status information.

FIG. 1 is a contextual diagram of an example of a system 100 for broadcasting device status information. The system includes several devices, such as a treadmill 120, a washing machine 122, and a television 124. Each of the devices 120, 122, 124 has an associated transmitter device or status reporting unit 130, 132, 134 that transmits advertisements over a wireless short-range radio interface 150. A user 110 also has a mobile device 112 that can receive the advertisements. The mobile device 112 may be, for example, a cellular phone, a smart phone, a laptop computer, a tablet computer, a smart watch, a wearable computer, or other mobile computing device. In some implementations, the user may use other types of devices, including a desktop computer or other stationary device, to receive and interpret advertisements.

As an example, the user 110 may enter a location such as house 105 that includes the devices 120, 122, 124. As noted above, each device 120, 122, 124 is associated with a status reporting unit 130, 132, 134 that can broadcast advertisements 140, 142, 144 using a wireless short-range radio interface 150 such as Bluetooth. The status reporting units 130, 132, 134 may transmit a multiple types of advertisements, including identity advertisements that identify the associated device, and status advertisements that indicate information about the status or operating state of the associated device. In the example of FIG. 1, the status reporting units 130, 132, 134 each transmit a status advertisement 140, 142, 144 that indicates device status information obtained from the respective device 120, 122, 124 associated the status reporting unit 130, 132, 134. When the user 110 is near the devices 120, 122, 124, the user's mobile device 112 receives the advertisements, which provides the user device status information about the state of the devices 120, 122, 124 when the user was nearby.

The device status information can indicate a current operating mode of the device 120, 122, 124 from among multiple possible operating modes. In some implementations, the operating mode indicates whether the device is powered on or powered off. The operating mode may indicate whether the device is in a sleep mode, or other low-power or wait state. In addition to or as an alternative to indicating device power status, the operating mode may indicate one of multiple operating modes for active operation or use of the device. As discussed further below, a device, when active or turned on, e.g., when in use, may have many different potential configurations or operating modes, e.g., 2, 3, 5, 10, 50, or more different modes. A device may have predetermined codes assigned for different operating modes, and device status information may include the code for the current operating mode. In some implementations, the device status information may include other information describing the operating mode of a device.

In some implementations, the device status information includes, for example, data that indicates the current state of the device associated with a status reporting unit. Data indicating the state of the device may include, for example, user configuration data such as customized user settings input into the device 120, 122, 124 by the user 110. Alternatively, or in addition, the data indicative of the state of the device may include data describing user interactions with each respective device 120, 122, 124. Alternatively, or in addition, the data indicative of the state of the device may include any attribute of a respective device 120, 122, 124. The status of many different types of devices may be tracked in this manner. As examples, a tracked device may be a home appliance (e.g., washing machine, refrigerator, freezer, oven, microwave oven, etc.), a vehicle, an exercise device (e.g., weight machine, treadmill, exercise bicycle, etc.), a piece of office equipment (e.g., a paper shredder, a copier, a printer, a desktop or laptop computer, etc.) or an entertainment device (e.g., a television, radio, DVD or Blu-Ray player, cable set-top box, etc.). Other devices can also provide status information, such as hospital equipment, factory equipment, tools, and so on. The device for which status information is provide can be stationary or moveable. For example, a mobile fitness device could provide status beacons. A status monitoring device could be attached to a pet's exercise equipment, such as a heart rate monitor for a dog or cat, in order to create a light-weight fitness tracker. The status monitoring device may acquire status information from any appropriate device through wired or wireless communication to be able to generate and send device status information.

The user's mobile device 112 may include an application or other software module that can initiate scans to detect advertisements, and thus detect the presence of a status reporting unit and its associated device. The software module may then include programmed functionality to collect, analyze, and interpret advertisements 140, 142, 144.

By way of example, the user 110 may use the treadmill 120 to exercise. Prior to beginning the user's exercise routine, the user may input user configuration data to a control panel on the treadmill 120. The user configuration data may include user-specific settings such as, for example, a speed setting, a program selection, or an incline level of 20 degrees. The user may activate the treadmill 120, and then proceed to perform the user's exercise routine according to input the user provided. Alternatively, or in addition, the user 110 may input or modify configuration data while the user is operating the treadmill 120.

Periodically, the status reporting unit 130 on the treadmill 120 detects the current configuration or operating state of the treadmill 120, and transmits the information in an advertisement. The status reporting unit 130 may include a wired or wireless interface with control circuitry of the treadmill 120 to determine the current configuration of the treadmill 120 at different times. For example, the status reporting unit 130 may repeatedly determine and transmit device status information at a regular interval (e.g., an interval of 1 second, 5 seconds, 30 second, 1 minute, 5 minutes, 1 hour, and so on.) Thus, in response to the expiration of a predetermined amount of time, the status reporting unit 130 may obtain device status information associated with the treadmill 120, where the device status information may include the user configuration data, the user interaction data, and/or other device settings. The status reporting unit 130 may encode the device's status information into an advertisement 140, and broadcast the advertisement 140 via a wireless short-range radio interface 150. As the user changes the operating mode or other settings of the treadmill 120, the advertisements 140 can indicate these changes. The status advertisements may indicate a variety of changing parameters or context information indicating the manner in which a user is using a device.

In some implementations, status advertisements 140 are interspersed between identity advertisements or other types of advertisements transmitted by the status reporting unit 130. The advertisements may have a relatively short fixed length, and so identity information can be sent in an identity advertisement and omitted from other types of advertisements. The status reporting unit 130 can send each advertisement using address for the status reporting unit 130, such as a media access control (MAC) address or other identifier, that is consistent over a series of multiple advertisements. The mobile device 112 can group status advertisements and identity advertisements together to link the appropriate status information with the correct device identity.

The user's mobile device 112, being in proximity to the status reporting unit 130, receives each of the status advertisements 140. For example, if a status advertisement 140 is transmitted every 5 seconds, the mobile device 112 gains information about the state of the treadmill 120 at a 5-second interval. From this information, the mobile device 112 can determine how long the user operated the treadmill 120 at different operating modes, giving the user fine-grained description of the user's exercise session. By receiving device status when the user is in physical proximity with the device, the mobile device 112 can automatically collect information that is relevant to the user. In addition, since the transmissions involve only one way communication from the status reporting unit 130 to the mobile device 112, the user's privacy can be maintained. The mobile device 112 receives information about device status, without indicating the identity of the user to any nearby devices or other users. The mobile device 112 can determine which received advertisements are relevant to the user based on signal strength or other criteria, giving the user useful information about not just which devices the user 110 used, but also the operating mode and user-specified configuration of the devices during use.

In some implementations, the control panel of the treadmill 120 may include programmed logic that monitors the user's interaction with the treadmill during the user's exercise routine, and logs data associated with the user's interaction with the treadmill. For instance, the treadmill's control panel may log data that indicates that the user ran 5 miles during the user's exercise routine. The user 110 may then deactivate the treadmill 120, ending the workout. In some implementations, the status reporting unit 130 may provide information, such as logged data or data summarizing a user's session of use, in advertisements.

A software module on the user's 110 mobile device 112 may scan for advertisements that may be transmitted by status reporting units 130 in proximity of the mobile device 112. A mobile device may include, for example, a mobile phone, smartphone, tablet, smart watch, personal digital assistant (PDA), laptop, or the like. In the example of FIG. 1, the user's 110 mobile device 112 detects advertisements 140, 142, 144 being broadcast by multiple status reporting units 130, 132, 134 that are each associated with a particular device such as the treadmill 120, washing machine 122, and television 124, respectively. The software module on the user's 110 mobile device 112 may obtain the advertisement, and access the corresponding device status information.

The software module may then forward the device status information to a particular mobile application on the mobile device 112 to which the device status information corresponds. For instance, the mobile device 112 may have a mobile application that is configured to process exercise information. In this instance, the mobile application may be able to obtain, and store, device status information describing the operation of the treadmill 120 during the user's exercise routine that indicates that the user exercised with a 20-degree incline, which is what the user entered into the treadmill's 120 control panel. Alternatively, or in addition, the device status information may show a pattern of use indicating that the user ran 5 miles. The application may use the device status information in other ways, such as generating a chart of different speeds of the treadmill at different times based on the data points indicated by the different status advertisements 140. The device status information may also include other properties associated with the treadmill 120 that are unrelated to the user-configuration data or user-interaction data. These properties may include external or environmental conditions sensed by a device (e.g., sensor data) or device-specific information.

In the example of FIG. 1, the user 110 may operate the other devices 122, 124, and receive status information about those devices also. For example, the user 110 may input user configuration data to each of the other respective devices 122, 124 depicted in FIG. 1, in the same, or similar manner, as described above with respect to the treadmill 120. The configurations the user specifies, or information about the operation of the devices, may be transmitted by the respective status reporting units and then received by the mobile device 112.

For instance, the user 110 may input user configuration data into the control panel of a washing machine 122 in the form of a selection of one or more predetermined attributes such as, for example, a particular water temperature (e.g., cold, warm, hot), load-size (e.g., small, medium, large, extra-large), and wash-cycle (e.g., light, medium, heavy). Then, the user may run the washing machine 122. The status reporting unit 132 can then communicate with the washing machine 122 to determine the user specified settings or a current mode of operation, and send that information as device status information in a status advertisement 142. For example, the advertisement 142 may indicate the user selections that were made. As another example, the advertisement 142 may indicate the current mode of operation, such as "initial rinse cycle" or "load completed," reflecting the current status of a task the user initiated.

In the same manner discussed above for the treadmill 120, the washing machine 122 may log user interaction data and operating data. For instance, the washing machine may include logic that tracks how many loads of laundry the user did in the last 24 hours, 48 hours, or the like. Alternatively, or in addition, the control panel of the washing machine may include programmed logic that calculated the amount of water that the user has used to wash clothes in the in the last 24 hours, 48 hours, or the like. These aggregate measures, may also be indicated in status advertisements 142. Multiple types of status advertisements may be provided to indicate different aspects of device status. For example, one advertisement 142 may describe a current status, another advertisement 142 may indicate an average status over an interval (e.g., last 30 seconds or last hour).

The status reporting unit 132 may interface with the control systems of the washing machine 122. In response to the expiration of predetermined amount of time, the status reporting unit 132 may obtain device status information associated with the washing machine 122 that includes the user configuration data, the user interaction data, and/or other device settings. The status reporting unit 132 may encode the devices status information into an advertisement 142, and broadcast the advertisement 142 via a wireless short-range radio interface 150.

By way of another example, the user 110 may input user configuration data to a television (and/or associated set top box) 124 that may include channel selection, audio volume, color settings, contrast settings, DVR settings, or the like. Then, the user may watch a set of one or more television shows, or a portion thereof, using the television 124. As the user uses the television, the status reporting unit 134 periodically transmits status advertisements 144 including information about the current operating mode of the television 124, such as the user configuration data discussed above, the current channel or input source, or metadata indicating the current program or episode being viewed. Similarly, if a DVR is recording a program, or has a program scheduled to record, that information may be indicated in a status advertisement 144. As a result, the user's mobile device 112 receives information about the state of the television 124 and/or set top box at the time that the user is in proximity to the television 124.

Similar to the treadmill 120 and washing machine 122, the television 124 may log user interaction data. For instance, the control panel of the television may include programmed logic that tracks which channels are being watched. Alternatively, or in addition, the control panel of the television 122 may track the amount of time that the each respective television channel has been watched. Alternatively, or in addition, the control panel of the television may track the number of instances of a show have been recorded to a DVR from each respective channel. The status reporting unit 134 may communicate with the television and/or set top box to obtain this information in order to generate appropriate advertisements 124. For example, the status reporting unit 134 may interface with the television 124. In response to the expiration of predetermined amount of time, the status reporting unit 134 may obtain device status information associated with the television 124 that includes the user configuration data, the user interaction data, and/or other device settings. The status reporting unit 134 may encode the devices status information into an advertisement 144, and broadcast the advertisement 144 via a wireless short-range radio interface 150.

Figure 2:
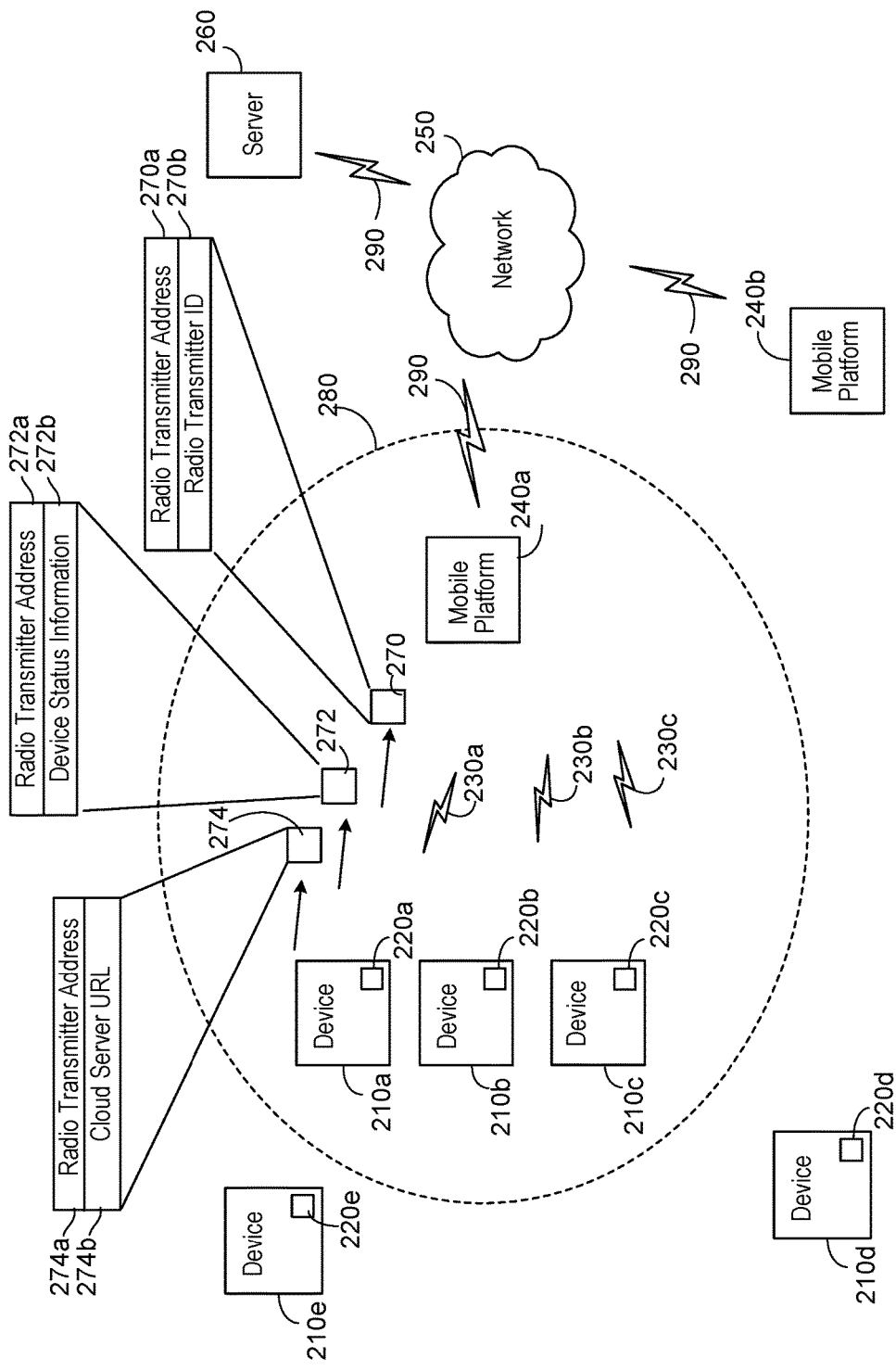
FIG. 2 is block diagram of an example of a system for broadcasting device status information.

FIG. 2 is block diagram of a system 200 for broadcasting device status information. System 200 may include multiple devices 210a, 210b, 210c, 210d, 210e, multiple status reporting units 220a, 220b, 220c, 220d, 220e, multiple wireless short-range radio interfaces 230a, 230b, 230c, multiple user devices shown as mobile platforms 240a, 240b, a network 250, multiple wired or wireless communication links 290, and a cloud-based server 260.

The devices 210a, 210b, 210c, 210d, 210e may include any type of device such as an appliance, exercise equipment, a consumer electronic device, industrial equipment, automobiles, automobile accessories, hospital computer terminals, or the like. Such examples are not intended to be limiting, and instead, are provided to show the wide scope of devices 210a, 210b, 210c, 210d, 210e that may fall within the scope of the present disclosure. Each device 210a, 210b, 210c, 210d, 210e may include a status reporting unit 220a, 220b, 220c, 220d, 220e, respectively. Each status reporting unit 220a, 220b, 220c, 220d, 220e may have similar features to the feature discussed with respect to the status reporting units of FIG. 1.

The status reporting units 220a, 220b, 220c, 220d, 220e may each include, for example, a processor, a data storage device, a radio transmitter, and a battery. The radio transmitter may include a wireless beacon. In at least one implementation, the wireless beacon may be a Bluetooth Low Energy (BLE) Beacon. The radio transmitter may be configured to periodically broadcast advertisements at a predetermined interval, for example, every second, every two seconds, every three seconds, every minute, every two minutes, every three minutes, etc. In some implementations, some or all of the advertisements are generated and transmitted using the Eddystone beacon format.

The status reporting units 220a, 220b, 220c, 220d, 220e may be configured to broadcast multiple different types of advertisements 270, 272, 274 using the radio transmitter. Each type of advertisement may include a header 270a, 272a, 274a and a body 270b, 272b, 274b respectively. However, each type of advertisement 270, 272, 274 may be configured to broadcast a particular type of information. For instance, an identity advertisement 270 may include a body 270b that is configured to transport a radio transmitter identifier. As another example, a status advertisement 272 may include a body 272b that is configured to transport device status information. As yet another example, an advertisement 274 may include a body 274b that is configured to transport a uniform resource locator (URL) that references the cloud-based server 260. The messaging framework that is used to facilitate broadcasting of the advertisements 270, 272, 274 is extensible, and may be adapted to facilitate transmission of additional advertisements that may be configured to transport different types of information. The advertisements broadcast by status reporting units 220a, 220b, 220c, 220d, 220e may be broadcast independent of, and without, any user request for the information being broadcast by the status reporting units.

Each of the advertisements 270, 272, 274 may be associated with a particular size limit. In one implementation, for example, the total size limit of each advertisement may be 31 bytes. In such an implementation the header may, for example, utilize 11 bytes, and the body may utilize, for example, 20 bytes. Accordingly, in such implementations, a status reporting unit 220a, 220b, 220c, 220d, 220e may encode the data that is to be included within the respective advertisement so that the radio transmitter ID, devices status information, or cloud server URL, respectively, fits within the body of the advertisement. Though the particular size of 31 bytes for each advertisement is set forth above, the present disclosure need not be so limited. Instead, other types of advertisements of other sizes may fall within the scope of this specification.

Broadcasting device status information for a single device 220a, 220b, 220c, 220d, 220e may require using multiple advertisements to transmit a single instance of device status information to a mobile platform 240a. For instance, a user may input user configuration data into device 210a, and then interact with device 210a. The status reporting unit 220a may use its radio transmitter to broadcast a first advertisement 270. The first advertisement may be associated with a header 270a that includes a radio transmitter address, and a body 270b that includes a radio transmitter identifier. The status reporting unit 220*b* may use its radio transmitter to broadcast a second advertisement 272. The second advertisement may be associated with a header 272*a* that includes a radio transmitter address, and a body 272*b* that includes device status information. Status reporting unit 220*a* may obtain device status information associated with device 210 in response to a determination that a predetermined period of time has expired. The predetermined period of time may be measured from the end of the user's interaction with the device. Alternatively, or in addition, the predetermined period of time may be a periodic interval that dictates the status reporting unit's sampling of device status information. The predetermined period of time may include every second, every two seconds, every three seconds, every minute, every two minutes, every three minutes, or the like. The status reporting unit 220*a* may also broadcast a third advertisement 274. The third advertisement 274 may be associated with a header 274*a* that includes a radio transmitter address, and a body 274*b* that include a uniform resource locator that points to a cloud server 260.

In at least one aspect, the status reporting unit may be configured to vary the transmission power or signal strength that is associated with the broadcast of each advertisement. For instance the status reporting unit may use a weaker signal strength for identity advertisements (e.g., indicating radio transmitter identifiers) than the signal strength used for device status information advertisements. Although the identity advertisements are transmitted with a lower transmission power, they may be transmitted much more frequently than status advertisements, for example, 5 times or 10 times more frequently. Such a feature may be beneficial when a mobile platform is near multiple similar or identical devices such as, for example, a row of multiple treadmills at a gym, a row of multiple industrial machines, or the like. With a comparatively weaker signal strength for identity advertisements, a mobile platform will only detect the identity information when the mobile platform is very close, and the identity information for other device that are likely not relevant to the user are less likely to be received. Because the identity advertisements are transmitted frequently, the user's mobile platform has many opportunities to detect the identity of the appropriate device. Also, since the identity advertisements are transmitted frequently, transmitting them with lower power reduces the number of irrelevant advertisements that the mobile platform receives, since advertisements from all except the nearest transmitters will not be received.

Similarly, the device status information can be transmitted with higher power to increase the likelihood of reception, since status advertisements are transmitted less frequently. In some implementations, each status advertisement is transmitted only once, indicating the current status at the time of transmission. This higher power transmission poses no problems for the mobile platform. Although many status advertisements may be received from different devices, status advertisements from distant devices will have unrecognized transmitter addresses, since the mobile platform generally will not receive the corresponding identity advertisements which were transmitted with less power. The mobile platform may filter the received status advertisements by their transmitter addresses and use only the status advertisements for the specific devices of interest. The devices of interest can be, for example, the devices for which identity advertisements were received with the signal strength.

A mobile platform 240*a* may utilize an application program interface in order to scan for advertisements being broadcast from one or more status reporting units 220*a*, 220*b*, 220*c*, 220*d*, 220*e*. The application program interface may be able to detect advertisements 270, 272, 274 from status reporting units that are within a predetermined proximity 280 from the mobile platform. For instance, the mobile platform's API may be able to detect advertisements from status reporting units are located within a predetermined proximity 280 to mobile platform. Accordingly, the application program interface may be able to detect advertisements transmitted by one or more status reporting units 220*a*, 220*b*, 220*c*. However, the application program interface of the mobile platform 240*a* may not be able to detect advertisements from the status reporting units 220*d*, 220*e*, because the status reporting units 220*d*, 220*e* are outside of the predetermined proximity 280 from the mobile platform 240*a*. Likewise, a mobile platform 240*b* may also include an application program interface that is configured to detect advertisements 270, 272, 274 from one or more status reporting units 220*a*, 220*b*, 220*c*, 220*d*, 220*e*. However, the mobile platform 240*b* may not be able to detect any of the particular advertisements provided in FIG. 2 because the mobile platform 240*b* is not within proximity of an of the status reporting units 220*a*, 220*b*, 220*c*, 220*d*, 220*e*.

The application program interface on the mobile platform may be configured to associate or "stitch" together the data that is associated with multiple detected advertisements 270, 272, 274. Stitching together the data received from multiple advertisements may include, for example, identifying a set of two or more advertisements that are associated with the same radio transmitter address. Advertisements from the same radio transmitter address may include data such as a transmitter address or device status information that are each associated with a particular user's interaction with a particular device 210*a*, 210*b*, 210*c*, 210*d*, 210*e*. In one aspect, the radio transmitter address may include a Bluetooth address (e.g., BD_ADDR) or a MAC address. In some instances, the radio transmitter address may be configured to rotate as a security feature. In such instances, the rotation of the radio transmitter address should be configured to remain on a particular radio transmitter address long enough such that at least a subset of two or more successively broadcasted advertisements 270, 272, 274 may have the same radio transmitter address.

In some instances, a status reporting unit may be able to encode all relevant device status information into a single device status information advertisement 272. Alternatively, or in addition, the status reporting unit may be need to utilize two or more advertisements in order to encode the obtained device status information related to a particular device 210*a*, 210*b*, 210*c*, 210*d*, 210*e* into device status information advertisements 272. In the event of multiple device status information advertisements, the application program interface may stitch together the multiple device status information advertisements in the same, or similar, manner to the stitching of a radio transmitter identifier advertisement and a device status information advertisement. Alternatively, the application programming interface may need to use the data obtained in one or more advertisements to seek additional information from a cloud-based server 260 via the network 250 and/or one or more communication links 290. The application program interface of the mobile platform 240*a* may access the cloud-based server using a URL received from one or more advertisements such as advertisement 274. The application program interface may submit requests to the cloud-based server that include, for example, the cloud-based server URL and a radio transmitter identifier.

The cloud-based server 260 may provide services such as, for example, a radio transmitter registry. The radio transmitter registry may include one or more databases that map radio transmitter identifiers to particular devices 210a, 210b, 210c, 210d, 210e, device types, organizations, or applications. The radio transmitter identifier broadcast by advertisement 270, and maintained in the radio transmitter registry, may include, for example, single 20 byte character string that identifies a particular radio transmitter. Alternatively, the radio transmitter identifiers may include, for example, a namespace identifier and/or an instance identifier. The namespace identifier may indicate, for example, that a particular radio transmitter is associated with a particular group of beacons. For instance, a namespace identifier may be associated all radio transmitters that are associated with a device 210a, 210b, 210c from a particular gym. In one implementation, the namespace identifier may utilize 10 bytes of a broadcasted advertisement 270. The instance identifier may indicate, for example, a particular radio transmitter within a group of radio transmitters. For instance, the instance identifier may indicate that the particular radio transmitter is radio transmitter #5. The instance identifier may utilize 6 bytes of a broadcasted advertisement 270. In some implementations, the transmitter identifier may also include 4 bits of reserved space. Thus, the cloud-based server may be configured to receive a particular radio transmitter identifier, and then provide information to a mobile platform 240a that includes the group of devices and/or the particular device that is associated with the received radio transmitter identifier. Though particular byte-size amounts are provided for specific examples of different aspects of a radio transmitter identifier, the present disclosure is not be so limited. Instead, it is considered that radio transmitter identifiers of different byte sizes also fall within the scope of this specification.

The cloud-based server 260 may be configured to store other types of data than just the radio transmitter registry. For instance, the cloud-based server may store one or more attachments. Attachments may be associated with one or more advertisements detected by an application program interface operating on a mobile platform. One or more device 210a, 210b, 210c, 210d, 210e and/or status reporting unit 220a, 220b, 220c, 220d, 220e providers may upload such attachments to the cloud-based server as an alternative to encoding the entire attachment into one or more advertisements. Thus, instead of encoding the attachment into one or more advertisements, the attachment may be uploaded to cloud-server 260, and then advertisement can be broadcast by the status reporting unit 220a, 220b, 220c, 220d, 220e that include a uniform resource location that can be used by an application program interface on a mobile platform to access the attachment from the cloud-based server 260.

Figure 3:
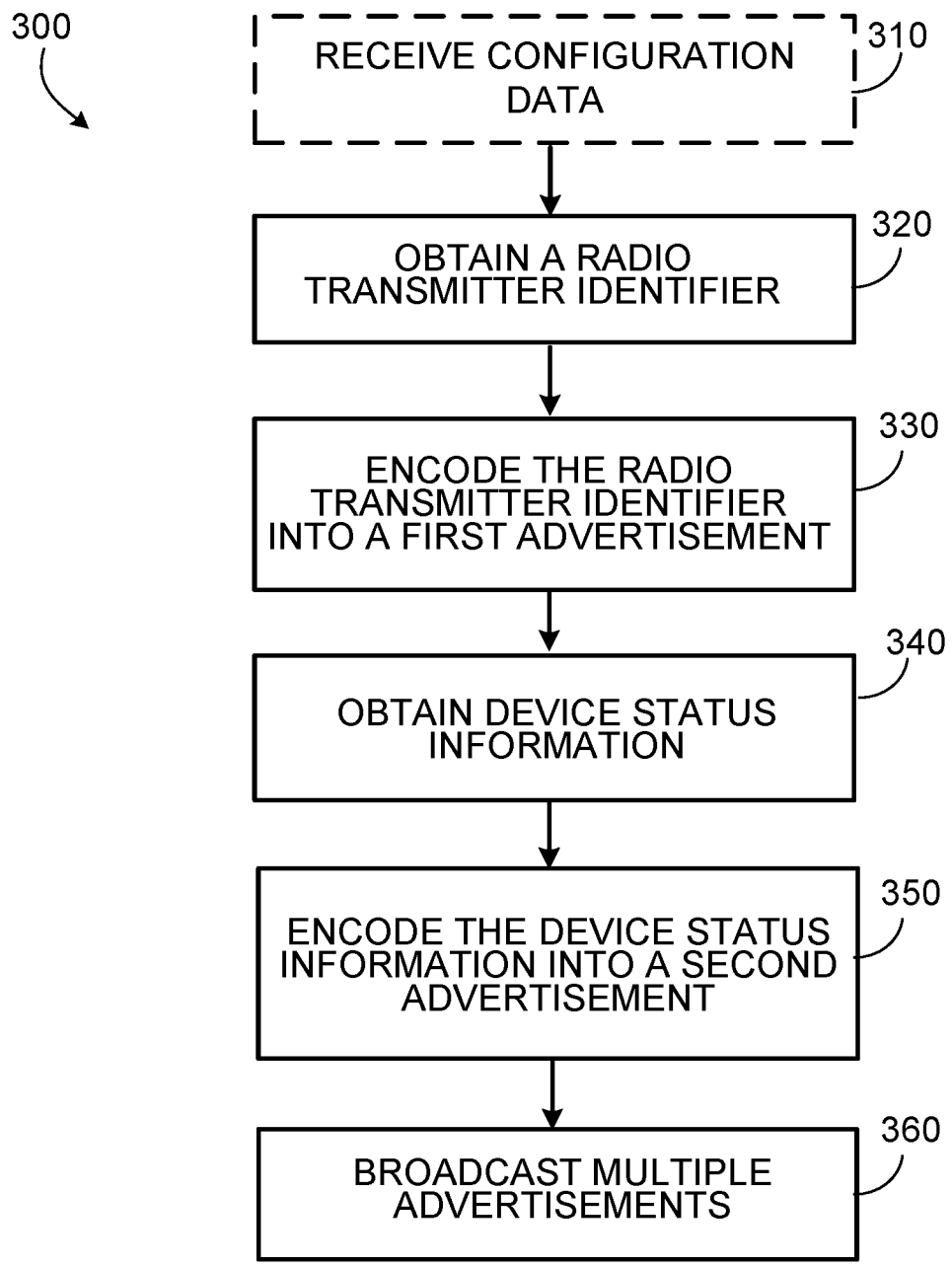
FIG. 3 is a flowchart of an example of a process for broadcasting device status information.

FIG. 3 is a flowchart of a process 300 for broadcasting device status information.

The process 300 may optionally begin at step 310 with a device that receives user configuration data that is input by a user. The user configuration data may include, for example, user-specific settings that are associated with one or more user-configurable features of the device. For instance, a user may configure the resistance settings associated with an exercise bike. Alternatively, for example, a user-configurable setting may include a modification made by a technician or engineer to a piece of industrial equipment, as such a modification is a modification to a feature of a device that is instigated by a user.

A user may operate the device for a period of time either before, and/or after, entering user configuration data. During the period of use, programmed logic associated with the device and/or a status reporting unit may log data related to the user's interaction with the device. User interaction data may include data such as, for example, data indicating that the user rode an exercise bike for 10 minutes, data indicating that the user ran 10 miles, data indicating that the user recorded 10 shows from channel 25, and/or the like.

The process may continue at step 320 when the status reporting unit encodes the radio transmitter identifier into the first advertisement. Encoding the radio transmitter identifier into the first advertisement may include, for example, compressing the radio transmitter identifier to fit within the available portion of the data frame that is associated with the first advertisement. The encoding of the radio transmitter identifier into the first advertisement may be done in response to the expiration of a predetermined period of time. The predetermined period of time may be every second, every 2 seconds, every 3 seconds, every minute, every 2 minutes, every 3 minutes, etc. The first advertisement may also include a radio transmitter address. The radio transmitter address may include, for example, a Bluetooth address or a MAC address.

At step 340, the status reporting unit may, for example, obtain the current state of the device status information. The status reporting unit may determine whether to obtain the device status information based on the expiration of a predetermined period of time. The predetermined period of time may be, for example every second, every two seconds, every three seconds, every minute, every two minutes, every three minutes, etc. The predetermined period of time used to determine whether to obtain the device status information may be the same predetermined period of time as the predetermined period of time that is monitored to determine when to encode the radio transmitter identifier into the first advertisement. Alternatively, the predetermined amount of time used to determine whether to obtain the device status information may be different than the predetermined amount of time that is monitored to determine when to encode the radio transmitter identifier into the first advertisement. The device status information may be obtained at the expiration of the predetermined amount of time regardless of whether the user is still operating the device or the user has ceased operating the device. The device status information may include, for example, data describing user configuration settings input into the device, data describing logged user interaction with the device, and/or one or more other device settings. The status reporting unit may encode 350 the device status information into a second advertisement. Encoding the device status information into the second advertisement may include, for example, compressing the device status information in order to fit the devices status information into the available portion of the data frame that is associated with the second advertisement.

The status reporting unit may broadcast 360 multiple advertisements using the status reporting unit's radio transmitter. The multiple advertisements may include, for example, the first advertisement and the second advertisement. The status reporting unit may vary the signal strength that is associated with each advertisement. In one implementation, the status reporting unit may make the signal strength of the first advertisement weaker than the signal strength of the second advertisement. The weaker signal for the first advertisement may require that a user's mobile platform be in close proximity to the device that includes a status reporting unit in order to detect the comparatively weaker signal that is associated with the first advertisement.

Figure 4:
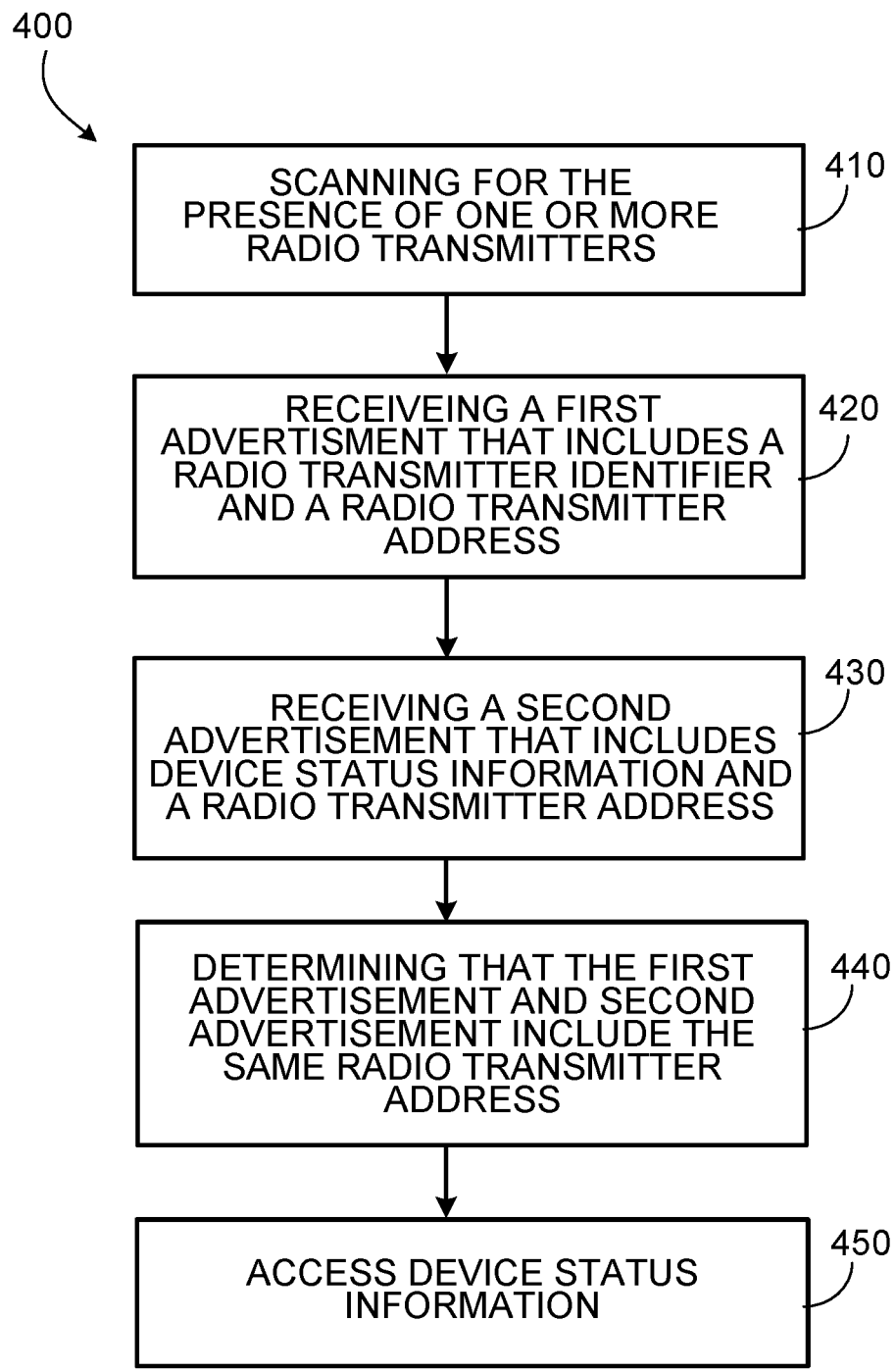
FIG. 4 is a flowchart of an example of a process for receiving device status information that has been broadcast by a radio transmitter.

FIG. 4 is a flowchart of a process 400 or receiving device status information that has been broadcast by a radio transmitter.

The mobile platform may include an application program interface that is configured to initiate a scan 410 to detect the presence of one or more radio transmitters. The application program interface may detect the presence of one or more radio transmitters by obtaining an advertisement that was broadcast by the one or more radio transmitters.

The mobile platform may receive 420 a first advertisement that includes radio transmitter identifier and a radio transmitter address. Either before, or after, receipt of the first advertisement, the mobile platform 430 may receive a second advertisement that includes devices status information and a radio transmitter address. The application program interface, or other programmed logic associated with the mobile platform, may analyze the received first and second advertisements. During the analysis of the first and second advertisements, the application program interface, or other programmed logic associated with the mobile platform, may determine that the first and second advertisement each include the same radio transmitter address. This determination leads the application program interface, or other programmed logic on the mobile platform, to conclude that the radio transmitter identifier in the first advertisement is related to the device status information in the second advertisement. The application program interface, or other programmed logic on the mobile platform, may access 450 the device status information and associate the device status information with a mobile application on the mobile platform that corresponds to the device associated with the radio transmitter identifier.

In some implementations, the application program interface, or other programmed logic on the mobile platform, may need to request additional information related to the radio transmitter identifier from a cloud-based server. For instance, the mobile platform may need to request the name, or type, of device that corresponds to the particular radio transmitter identifier from the cloud-based server. Alternatively, or in addition, the mobile platform may need to download one or more attachments, as described above. The mobile platform may access the cloud-based server using a URL to the cloud-based server that is obtained from a detected advertisement, or from a URL that is embedded within the application program interface on the mobile platform.

In situations in which the systems discussed here collect personal information about users, or may make use of personal information, a user may be provided with controls allowing the user to make an election as to both if and when systems, programs or features described herein may enable collection of user information (e.g., information about a user's social network, social actions or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

Embodiments of the subject matter, the functional operations and the processes described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps may be provided, or steps may be eliminated, from the described processes. Accordingly, other implementations are within the scope of the following claims.

The invention claimed is:

1. A transmitter device coupled to a first device, the transmitter device comprising:
   a radio transmitter;
   one or more processors; and
   one or more data storage devices storing (i) a radio transmitter identifier, (ii) a radio transmitter address, and (iii) instructions that are operable, when executed by the one or more processors, to cause the one or more processors to perform operations comprising:
      obtaining configuration data for the first device, the configuration data indicating a user-specified configuration of the first device, wherein the user-specified configuration includes one or more user-specified settings input into the first device by a user that define settings of a mode of operation of the first device;
      accessing the stored radio transmitter identifier from the one or more data storage devices;
      generating a first advertisement that indicates the radio transmitter address and the radio transmitter identifier;
      generating a second advertisement that indicates the radio transmitter address and an encoding of the obtained user-specified configuration data that represents the one or more user-specified settings input into the first device by the user that define settings of a mode of operation of the first device; and
      broadcasting, using the radio transmitter, for detection by a second device, a series of advertisements that includes at least the first advertisement and the second advertisement,
      wherein the second device is configured to associate the configuration data with a mobile application that corresponds to the first device in response to determining that the radio transmitter address of the first advertisement is the same as the radio transmitter address of the second advertisement.

2. The transmitter device of claim 1, wherein obtaining the configuration data for the first device comprises: in response to the first device receiving, from the user, user input that configures the first device to operate in a particular operating mode, receiving, by the transmitter device, configuration data that indicates the particular operating mode of the first device specified by the user input from the user.

3. The transmitter device of claim 1, wherein obtaining the configuration data for the first device comprises obtaining configuration data for the first device that indicates both a current operating mode of the first device and the user-specified configuration of the first device.

4. The transmitter device of claim 1, wherein transmitting the second advertisement comprises transmitting the first advertisement or the second advertisement at a transmission power level that restricts reception to within a predetermined level of proximity to the first device.

5. The transmitter device of claim 1,
wherein the first device includes a control panel of a treadmill, and
wherein the one or more user-specified settings input into the control panel of the treadmill include a speed, a program selection, or a level of incline.

6. The transmitter device of claim 1,
wherein first device includes a control panel of a washing machine, and
wherein the one or more user-specified settings input into the control panel of the washing machine include a water temperature, a load size, or a wash cycle.

7. The transmitter device of claim 1, wherein broadcasting the series of advertisements that includes at least the first advertisement and the second advertisement comprises:
broadcasting the first advertisement and the second advertisement at different power levels using the radio transmitter, wherein the first advertisement is broadcast at a lower power level than the second advertisement.

8. The transmitter device of claim 1,
wherein the first device includes a set top box, and
wherein the one or more user-specified settings input into the set top box include one or more channel selections, one or more digital video recorder settings, or one or more television settings.

9. The transmitter device of claim 1,
wherein the radio transmitter identifier includes a namespace identifier and an instance identifier,
wherein the names pace identifier identifies a group of radio transmitters, and the instance identifier identifies a particular radio transmitter within the group of radio transmitters.

10. The transmitter device of claim 1, wherein the radio transmitter address is a Bluetooth address or a media access control address.

11. The transmitter device of claim 1, wherein the first advertisement and the second advertisement are each generated according to an Eddystone frame format.

12. The transmitter device of claim 1, wherein the transmitter device is a beacon configured for one-way communication over a wireless interface, the beacon being configured to not receive transmissions over the wireless interface,
wherein generating the second advertisement comprises generating the second advertisement to exclude the radio transmitter identifier.

13. The transmitter device of claim 3, wherein the operations further comprise:

obtaining, at each of multiple different times according to a predetermined interval, configuration data indicating a current operating mode of the first device, the current operating modes being different for at least some of the different times; and
generating, for each of the multiple different times, a status advertisement indicating the current operating mode of the first device indicated by the obtained configuration data;
wherein broadcasting the series of advertisements comprises:
broadcasting the status advertisements at a predetermined interval, each of the status advertisements indicating the current mode of operation of the first device at the time the status advertisement is transmitted; and
broadcasting one or more repetitions of the first advertisement between each status advertisement broadcast.

14. The transmitter device of claim 13, wherein broadcasting the series of advertisements comprises interleaving the first advertisement and the status advertisements such that multiple repetitions of the first advertisement are transmitted for each status advertisement broadcast.

15. The transmitter device of claim 1, wherein the operations further comprise:
after broadcasting the first advertisement and the second advertisement, obtaining additional configuration data for the first device that is different from the previously obtained configuration data, the additional configuration data indicating a configuration or mode of operation that was changed by a user of the first device after broadcast of the second advertisement;
in response to receiving the additional configuration data, generating a third advertisement that indicates the radio transmitter address and an encoding of the additional configuration data for the first device indicating the changed configuration or mode of operation; and
broadcasting the third advertisement and one or more additional repetitions of the first advertisement.

16. A method comprising:
obtaining, by a transmitter device, configuration data for a first device, the configuration data indicating a user-specified configuration of the first device, wherein the user-specified configuration includes one or more user-specified settings input into the first device by a user that define settings of a mode of operation of the first device;
accessing, by the transmitter device, the stored radio transmitter identifier from the one or more data storage devices;
generating, by the transmitter device, a first advertisement that indicates the radio transmitter address and the radio transmitter identifier;
generating, by the transmitter device, a second advertisement that indicates the radio transmitter address and an encoding of the obtained user-specified configuration data that represents the one or more user-specified settings input into the first device by the user that define settings of a mode of operation of the first device; and
broadcasting, by the transmitter device using the radio transmitter, for detection by a second device, a series of advertisements that includes at least the first advertisement and the second advertisement,
wherein the second device is configured to associate the configuration data with a mobile application that corresponds to the first device in response to determining that the radio transmitter address of the first advertisement is the same as the radio transmitter address of the second advertisement.

17. The method of claim 16, wherein obtaining the configuration data for the first device comprises: in response to the first device receiving, from the user, user input that configures the first device to operate in a particular operating mode, receiving, by the transmitter device, configuration data that indicates the particular operating mode of the first device specified by the user input from the user.

18. The method of claim 17, wherein transmitting the second advertisement comprises transmitting the second advertisement to the mobile device of the user while the first device is operating in the particular operating mode specified by the user input from the user.

19. A non-transitory machine-readable medium storing software comprising instructions executable by one or more processors which, upon such execution, cause a transmitter device to perform operations comprising:
- obtaining, by the transmitter device, configuration data for a first device, the configuration data indicating a user-specified configuration of the first device, wherein the user-specified configuration includes one or more user-specified settings input into the first device by a user that define settings of a mode of operation of the first device;
- accessing, by the transmitter device, the stored radio transmitter identifier from the one or more data storage devices;
- generating, by the transmitter device, a first advertisement that indicates the radio transmitter address and the radio transmitter identifier;
- generating a second advertisement that indicates the radio transmitter address and an encoding of the obtained user-specified configuration data that represents the one or more user-specified settings input into the first device by the user that define settings of a mode of operation of the first device; and
- broadcasting, by the transmitter device using the radio transmitter, for detection by a second device, a series of advertisements that includes at least the first advertisement and the second advertisement,
- wherein the second device is configured to associate the configuration data with a mobile application that corresponds to the first device in response to determining that the radio transmitter address of the first advertisement is the same as the radio transmitter address of the second advertisement.

20. The transmitter device of claim 1,
wherein the second device is configured to, upon detection of the first advertisement and the second advertisement, obtain the user-configuration data for the first device using the first advertisement and the second advertisement.

* * * * *